United States Patent [19]

Zwayer

[11] Patent Number: 5,692,692
[45] Date of Patent: Dec. 2, 1997

[54] CLICKER ELEMENT FOR FISHING REEL

[75] Inventor: Kent Lee Zwayer, Tulsa, Okla.

[73] Assignee: Zebco Div. of Brunswick Corporation, Tulsa, Okla.

[21] Appl. No.: 501,708

[22] Filed: Jul. 12, 1995

[51] Int. Cl.⁶ .................................................. A01K 89/027
[52] U.S. Cl. ........................ 242/244; 242/268; 242/306
[58] Field of Search ...................... 242/306, 267, 242/268, 244

[56] References Cited

U.S. PATENT DOCUMENTS

| | | |
|---|---|---|
| 2,180,321 | 11/1939 | Kovalovsky et al. . |
| 2,209,598 | 7/1940 | Coxe . |
| 2,485,741 | 10/1949 | King . |
| 2,569,006 | 9/1951 | King . |
| 3,123,318 | 3/1964 | Wood ................................ 242/268 |
| 3,971,530 | 7/1976 | Murvall . |
| 4,496,115 | 1/1985 | Kreft et al. . |
| 4,513,925 | 4/1985 | Yamaguchi . |
| 4,548,370 | 10/1985 | Noda . |
| 4,591,108 | 5/1986 | Ban . |
| 4,741,489 | 5/1988 | Emura et al. . |
| 4,943,012 | 7/1990 | Aoki . |
| 5,149,009 | 9/1992 | Sato ................................... 242/306 |
| 5,192,036 | 3/1993 | Sato ................................... 242/306 |
| 5,374,002 | 12/1994 | Sato ................................... 242/268 |
| 5,518,194 | 5/1996 | Jeung ................................. 242/306 |

FOREIGN PATENT DOCUMENTS

| | | |
|---|---|---|
| 215251 | 9/1967 | Sweden . |
| 711126 | 6/1954 | United Kingdom . |

*Primary Examiner*—Katherine Matecki
*Attorney, Agent, or Firm*—Wood, Phillips, VanSanten, Clark & Mortimer

[57] ABSTRACT

A fishing having a frame, with a reel operating mechanism on the flame. The reel operating mechanism includes a line carrying spool, first structure for directing line onto the line carrying spool, and a settable drag mechanism for allowing line to be drawn off of the spool with a variable predetermined force applied to fishing line on the line carrying spool. The drag mechanism includes a first member, with there being second structure cooperating between the first member and frame for guiding the first member in rotation relative to the frame around a first axis as an incident of which the predetermined force at which line is allowed to be drawn off of the spool is changed. The fishing reel further includes a clicker element, with there being third structure cooperating between the clicker element and one of the frame and operating mechanism for maintaining the clicker element in an operative position on the fishing reel. Fourth structure on the other of the frame and operating mechanism cooperates with the clicker element for giving a sensory indication to the user as an incident of the first member rotating about the first axis. The clicker element has a body that includes first and second legs, with the third structure engaging each of the first and second legs at spaced locations with the one of the frame and operating mechanism.

20 Claims, 3 Drawing Sheets

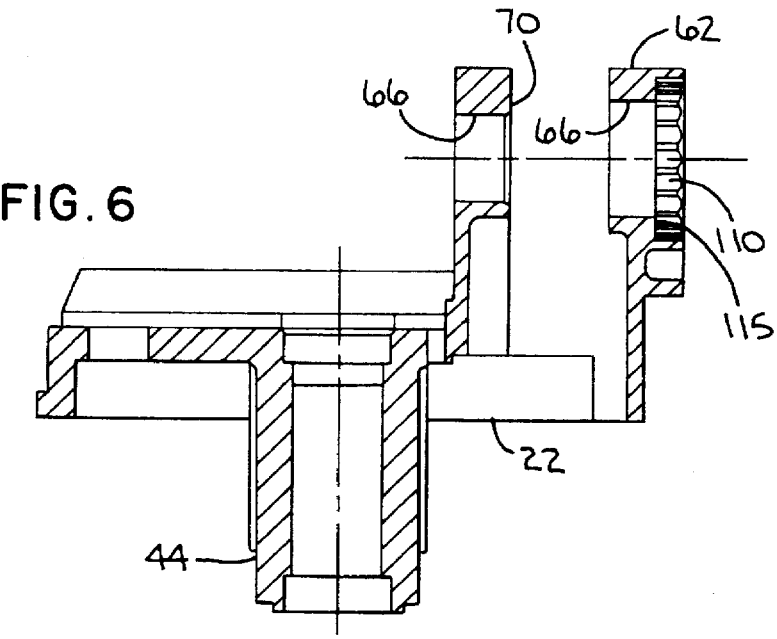
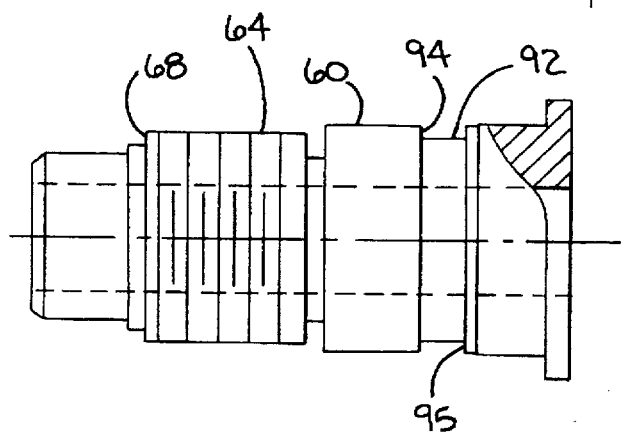
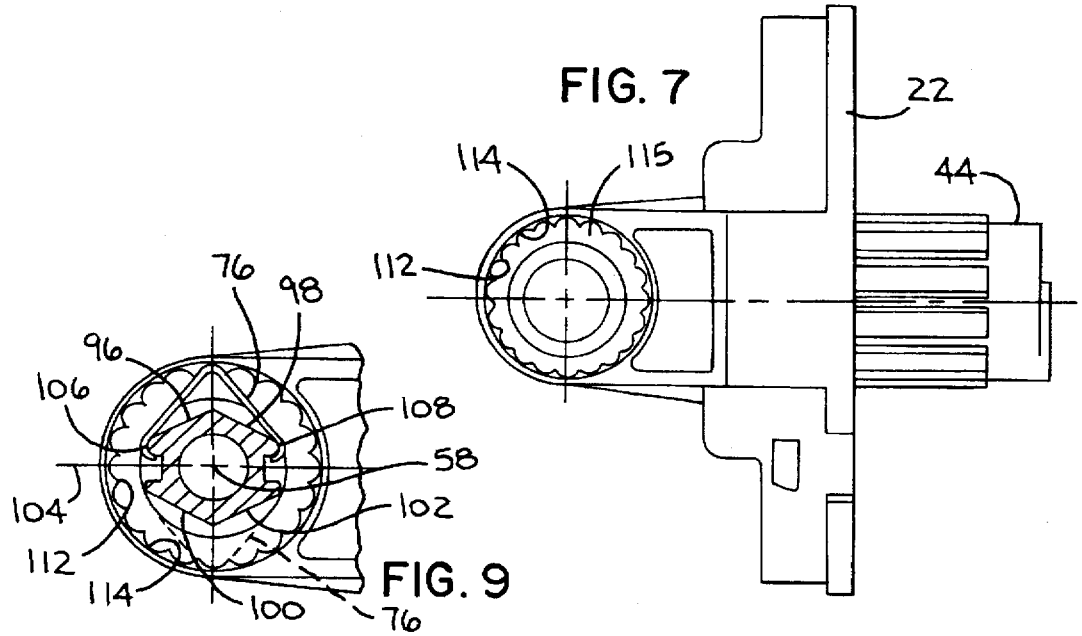

CLICKER ELEMENT FOR FISHING REEL

BACKGROUND OF THE INVENTION

1. Field of the Invention

This invention relates to fishing reels and, more particularly, to a clicker for giving a user of the fishing reel a sensory indication that a part of the fishing reel has been moved. This part could be associated with a drag mechanism or another mechanism on the reel.

2. Background Art

On most fishing reels, a settable drag mechanism is incorporated. These drag mechanisms are designed to allow a line carrying spool to slip in response to a force of a predetermined magnitude being applied to the line, as by a fish. The force at which the spool slips can be changed, typically through an external actuator.

In many fishing reels, the drag actuator is in the form of a rotatable knob. The user will commonly set the drag where desired through a trial and error exercise. That is, the user will change the drag setting and manually pull on the line to make certain that the drag setting is what is desired.

During operation of the fishing reel, the user may inadvertently rotate the drag actuator. This may cause an unwanted increase or decrease in the drag setting on the spool. Once a fish is hooked, the user may then be required to reset the drag while at the same time keeping tension on the line to avoid losing the fish. If the drag force was inadvertently increased, the line is prone to breaking. If the drag force was inadvertently decreased, a hooked fish could easily withdraw line and entangle the line with underwater obstacles.

To avoid any undetected movement of the drag actuator, it is known to incorporate a clicker mechanism that produces a noise that is audible to the user as the actuator knob is operated.

In U.S. Pat. No. 5,071,086, one form of clicker is disclosed. The clicker includes a formed wire element having a cantilevered end that rides serially over spaced serrations on a member relative to which the actuator is rotated, to thereby produce an audible clicking noise.

While this type of clicker mechanism works effectively, it has a relatively delicate form. Manual assembly of the clicker requires a good degree of dexterity. Proper seating of the clicker element may be relatively time consuming, thereby potentially slowing down production on a manual assembly line.

Another form of clicker mechanism is shown in Swedish Patent No. 21525 1. The clicker element is riveted in place on a crank handle and has an end that projects in cantilever fashion therefrom to ride over serially arranged, spaced projections as the crank handle is operated. The use and assembly of a separate fastener to hold the clicker element in place complicate assembly. Not only must a supply of the fasteners be kept on hand, but they must be put in place while holding the clicker element in precise alignment on the crank handle. This is also a delicate procedure. Further, the cantilevered portion of the clicker element is prone to turning, bending, or in a worst case, breaking in use. Overall, this mechanism appears to be relatively complicated and time consuming to construct, and also prone to failure.

SUMMARY OF THE INVENTION

In one form of the invention, a fishing reel is provided having a reel frame, with a reel operating mechanism on the frame. The reel operating mechanism includes a line carrying spool, first structure for directing line onto the line carrying spool, and a settable drag mechanism for allowing line to be drawn off of the spool with a variable predetermined force applied to fishing line on the line carrying spool. The drag mechanism includes a first member, with there being second structure cooperating between the first member and frame for guiding the first member in rotation relative to the frame around a first axis as an incident of which the predetermined force at which line is allowed to be drawn off of the spool is changed. The fishing reel further includes a clicker element, with there being third structure cooperating between the clicker element and one of the frame and operating mechanism for maintaining the clicker element in an operative position on the fishing reel. Fourth structure on the other of the frame and operating mechanism cooperates with the clicker element for giving a sensory indication to the user as an incident of the first member rotating about the first axis. The clicker element has a body that includes fast and second legs, with the third structure engaging each of the first and second legs at spaced locations with the one of the frame and operating mechanism.

In one form, the clicker element body has a V-shaped configuration and an apex at the juncture of the first and second legs, with the fourth structure cooperating with the apex of the clicker element body to give the sensory indication to the user.

The fourth structure can be a plurality of serially arranged projections and recesses, with the apex of the clicker member body moving into and out of the recesses and over the projections as the first member rotates about the first axis.

The first and second legs may define a V shape with an included angle, with the body being symmetrical on both sides of a plane bisecting the included angle.

The third structure may allow the clicker element to be placed into and removably maintained in the operative position by press fitting.

The clicker element may be made from a single piece of formed wire or flat metal stock.

In one form, the first and second legs each have a free end with at least one of the first and second legs being bendable. With the clicker element in a relaxed state, the free ends of the first and second legs are spaced from each other a first distance. With the clicker element in the operative position, the free ends of the first and second legs are spaced a second distance that is different than the first distance.

A projection can be provided on one of a) one of the first and second legs and b) the one of the frame and operating element. A seat for the projection can be provided on the other of the one of the first and second legs and the one of the frame and operating element. The projection is biased into the seat with the clicker element in the operative position.

The third structure may maintain the clicker element in a second operative position on the fishing reel wherein the fourth structure cooperates with the clicker element for giving a sensory indication to the user as an incident of the first member rotating about the first axis.

In one form, the first member is a rotatable sleeve that is captive between the first and second legs of the clicker element body with the clicker element in the operative position.

In one form, a part of the frame guides rotation of the first member and the fourth structure is formed as one piece with the part of the frame.

The operating mechanism may include a crank shaft with a crank handle thereon that is manipulatable by an operator to effect rotation of the crank shaft. The crank shaft is guided in rotation within the first member.

The first member can have a cylindrical shape with a radial undercut defining an axially facing surface. With the clicker element in the operative position, at least a part of the clicker element abuts to the axially facing surface.

An actuator knob can be provided, with the clicker element being captive between the axially facing surface on the first member and the actuator knob.

In one form, the first member has a cylindrical shape with first and second flat surfaces angled with respect to each other and each terminating at a projection. Each of the first and second legs on the clicker element is bendable towards and away from the other, with the first and second legs being joined at an apex to define a V shape. The first and second legs each have a free end with a seat adjacent thereto. By abutting the free ends of the legs of the clicker element, one each to the flat surfaces of the first member, and pressing the clicker element against the first member, the first and second legs bias progressively away from each other until the projections on the first member align one each with the seats adjacent the free ends of the legs of the clicker element, whereupon the first and second legs spring back towards each other to biasably maintain the projections in the seats.

In another form of the invention, a fishing reel is provided having a frame and a reel operating mechanism on the frame, which reel operating mechanism includes a line carrying spool, first structure for directing line onto the line carrying spool, and a settable drag mechanism for allowing line to be drawn off of the spool with a variable predetermined force applied to the fishing line on the line carrying spool. The drag mechanism includes a first member, with there being second structure cooperating between the first member and frame for guiding the first member in rotation relative to the frame around a first axis as an incident of which the predetermined force at which line is allowed to be drawn off of the spool is changed. A clicker element is provided, with there being third structure cooperating between the clicker element and first member for press fitting and maintaining the clicker element in an operative position on the fishing reel. Fourth structure on the frame cooperates with the clicker element for giving a sensory indication to the user as an incident of the first member rotating about the first axis.

BRIEF DESCRIPTION OF THE DRAWINGS

FIG. 6 is an enlarged, cross-sectional view of a reel body on the fishing reel of FIG. 1;

FIG. 7 is an enlarged, side elevation view of the reel body in FIG. 6;

FIG. 8 is an enlarged, end elevation view of a sleeve to which the clicker element is attached; and FIG. 9 is an enlarged, fragmentary, side elevation view of the reel body showing the sleeve in FIG. 8 connected to the reel body and the clicker element in an operative position on the sleeve.

DETAILED DESCRIPTION OF THE DRAWINGS

Figure 1:
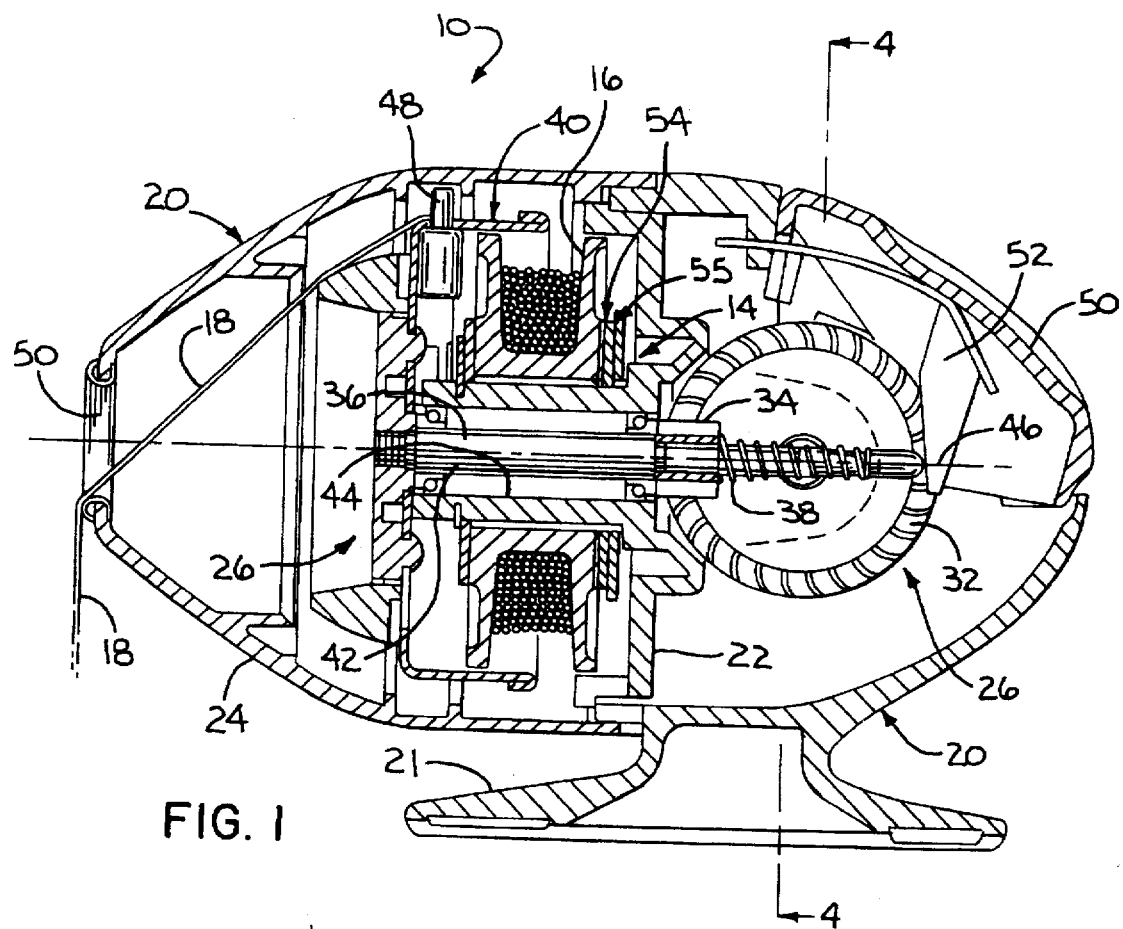
FIG. 1 is a cross-sectional view of a fishing reel having a clicker element, according to the present invention, incorporated therein.
Figure 2:
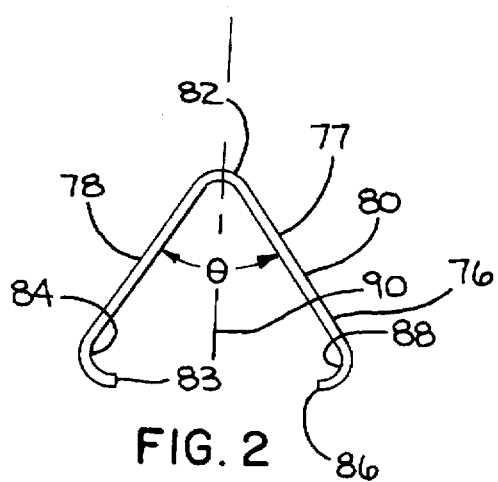
FIG. 2 is an enlarged, side elevation view of the inventive clicker element.
Figure 3:
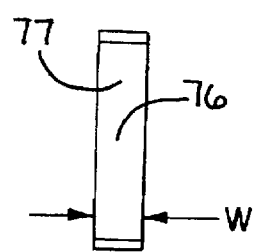
FIG. 3 is an enlarged, end elevation view of the inventive clicker element.
Figure 4:
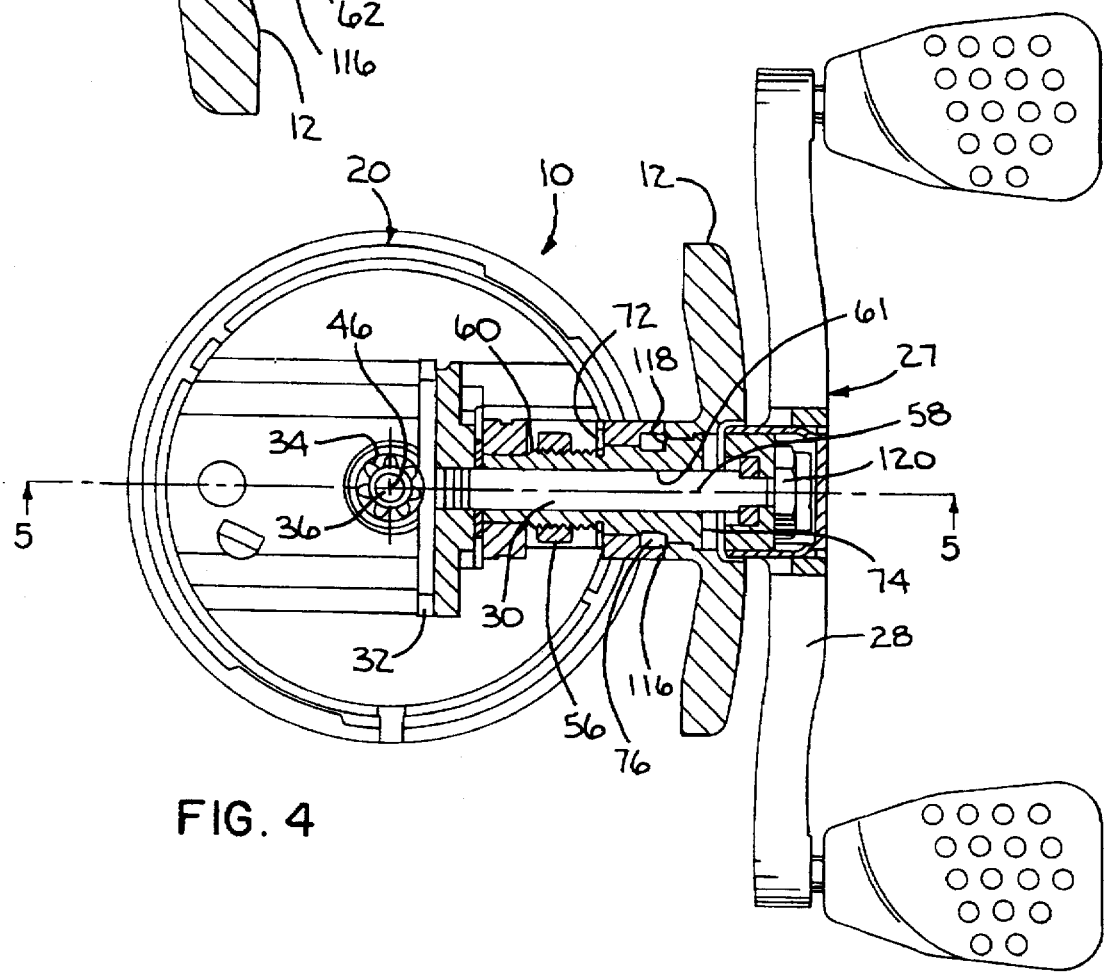
FIG. 4 is an enlarged, cross-sectional view of the fishing reel taken along line 4—4 of FIG. 1.

In FIGS. 1 and 4, one exemplary fishing reel, into which the present invention is incorporated, is shown at 10. The invention is directed to a means for producing a sensory indication to a user in response to movement of a drag actuator knob 12, which operates a drag assembly 14 (see also FIG. 5) to produce a variable holding force on a spool 16 upon which a supply of line 18 is wound. It should be understood that the invention can be incorporated into any type of fishing reel and will function in the same manner as described hereinbelow. The fishing reel 10 shown is intended only to exemplify one environment for the invention.

To understand the present invention it is not necessary to know all operating details of the fishing reel 10. A general description of the fishing reel operation will be given herein. A more detailed description of the operation of a similar type reel is given in U.S. Pat. No. 5,199,665, incorporated herein by reference.

The fishing reel 10 has a frame 20, which includes a mounting foot 21, a reel body/deck plate 22, and an outer casing 24. The casing 24 extends around a part of a reel operating mechanism 26 that is mounted on and within the frame 20.

The reel operating mechanism 26 includes a crank assembly at 27, including a crank handle 28 situated externally of the frame 20 to be grasped by a user. The crank handle 28 rotates a laterally extending crank shaft 30 which carries a face gear 32. The face gear 32 is in mesh with a pinion gear 34 on a center shaft 36, normally biased by a spring 38 to translate to a rearward position on the frame 20. A spinner head assembly 40 is mounted on the forward end 42 of the center shaft 36.

The center shaft 36 is journalled within a boss 44 on the reel body 22 for rotation about a fore and aft axis 46. As this occurs, with the reel 10 in the retrieve mode of FIG. 1, a pickup pin 48 on the spinner head assembly 40 draws line 18, extending from the spool 16 over the spinner head assembly 40 and through a front line guide 50, in a wrapping motion around the spool 16.

By pivoting a thumb button 50, a lug 52 thereon drives the center shaft 36 forwardly against the force of the spring 38, which causes retraction of the pickup pin 48. The fishing reel 10 is then in the cast mode, in which line 18 is allowed to pay freely off of the spool 16.

Through the drag assembly 14, a variable holding force is developed between the spool 16 and the reel body, through a drag washer 54 that is captive between the spool 16 and a spool washer 55 surrounding the boss 44. This drag force resists rotation of the spool 16 around the axis 16 resulting from a force applied on the line 18, as would allow payout of line with the reel 10 in the retrieve mode. The drag force is varied through a slide element 56 that is laterally movable by rotation of the drag actuator knob 12 around the crank shaft axis 58. The slide element 56 surrounds and is threadably engaged with a bearing sleeve 60 (see also FIGS. 6 and 8). The bearing sleeve 60 has an internal through bore 61 within which the crank shaft 30 is guided in rotation. The bearing sleeve 60 is in turn journalled for rotation within a boss 62 on the reel body 22. The bearing sleeve 60 has a stepped outer surface 64 that is closely received within a complementary bore 66 through the boss 62. With the bearing sleeve 60 fully inserted, an annular shoulder 68 thereon abuts to a facing surface 70 on the boss 62. A clip 72 prevents withdrawal of the bearing sleeve 60 from its fully assembled position of FIG. 4.

The drag actuator knob 12 is keyed to the outer end 74 of the beating sleeve 60. The drag actuator knob 12 has a conventional star-shaped configuration, to facilitate its rotation.

As seen in FIGS. 1–5, 7 and 9, a clicker element 76 is removably attached to the bearing sleeve 60 in such a manner that the clicker element 76 follows rotative movement of the bearing sleeve 60. The clicker element 76 has a body 77 with an overall V shape defined by first and second legs 78, 80. The legs 78, 80 meet at an apex 82. The leg 78 has an inturned free end 83 defining a U-shaped seat 84. The leg 80 has a like inturned free end 86 defining a U-shaped seat 88 opening towards the seat 84 on the leg 78.

The clicker element 76 is preferably made from a single piece of flat, flexible, metal stock. Alternatively, it could be formed from wire. The legs 78, 80 are movable selectively towards and away from each other to vary the angle (θ) between the legs 78, 80. With the clicker element in a relaxed state, the angle (θ) between the legs 78, 80 is on the order of 66°. The body 77 of the clicker element 76 is symmetrical about a plane 90 bisecting the angle (θ) between the legs.

The bearing sleeve 60 has a radial undercut 92 deeming axially facing, annular surfaces 94, 95 spaced a distance slightly greater than the width (W) of the body 77 of the clicker element 76. The undercut 92 is defined by a first pair of flat surfaces 96, 98, that are angled with respect to each other and a diametrically opposite second pair of flat surfaces 100, 102, that are similarly angled with respect to each other. The cross section of the undercut section of the bearing sleeve 60, as shown in FIG. 9, is symmetrical about the line 104, and the description herein will be focused on the representative upper half of the undercut portion of the bearing sleeve 60 in FIG. 9.

The surface 96 terminates in a rounded projection 106, with the surface 98 terminating in a like projection 108. It is intended that the projections 106, 108 simultaneously nest in the seats 84, 88 on the clicker element 76. The legs 78, 80 must be spread away from each other from the relaxed state of FIG. 2 to allow the projections 106, 108 to seat. By aligning the legs 78, 80 over the sleeve surfaces 96, 98, the free leg ends 83, 86 can be pressed against the surfaces 96, 98. As this occurs, the legs 78, 80 cam away from each other until the free ends 83, 86 clear the projections 106, 108, whereupon the legs 78, 80 spring back and captively hold the bearing sleeve 60. Shifting of the clicker element 76 axially of the bearing sleeve 60 is confined by the facing surfaces 94, 95.

With the arrangement shown, the clicker element 76 can be placed either in a first operative position, shown in solid line position in FIG. 9, or a second operative position as shown in dotted lines in FIG. 9. The clicker element 76 can be pressed into either operative position in the same manner. This facilitates assembly in that a maximum rotation of 45° is required to align the clicker element 76 for assembly.

With the clicker element 76 in the operative position and the bearing sleeve 60 pressed into the boss 62, the apex 82 is in axial overlapping relationship with an undercut surface 110 on the boss 62. The undercut surface 110 has projections 112 and recesses 114 alternating in an annular arrangement therearound.

As the beating sleeve 60 is rotated around the axis 58, the apex 82 moves into a recess 114. As rotation continues, the apex 82 encounters the adjacent projection 112. The projection 112 acts on the apex 82 to compress the legs 78, 80 radially inwardly so that the apex 82 moves inwardly sufficiently to clear the projection 112. Further rotation places the apex 82 in alignment with the next recess 114. As this occurs, the clicker element springs back towards its relaxed state of FIG. 2 and produces an audible noise as the apex 82 bottoms out in the recess 114. This action cannot only be heard but can be tactilely sensed.

In a preferred form, the projections 112 are formed as one piece with the boss 62, which is in mm formed as one piece with the remainder of the reel body 22. This facilitates manufacture, obviating the need to assemble a separate part to the reel body 22 to cooperate with the clicker element 76.

The recesses 114 define an axially facing undercut shoulder 115 on the boss 62 to which the clicker element 76 can abut with the clicker element 76 in its operative position.

The actuator knob 12 has a cylindrical body 116 with an axially facing, annular surface 118, which confronts the clicker element 76 in its operative state. The clicker element 76 is thus captive in its operative state between the boss surface 115 and the actuator 12.

The crank handle 28 is held to the end of the crank shaft 30 through a nut 120 and in turn captively maintains the drag actuator knob 12 in the assembled position of FIG. 4.

Figure 5:
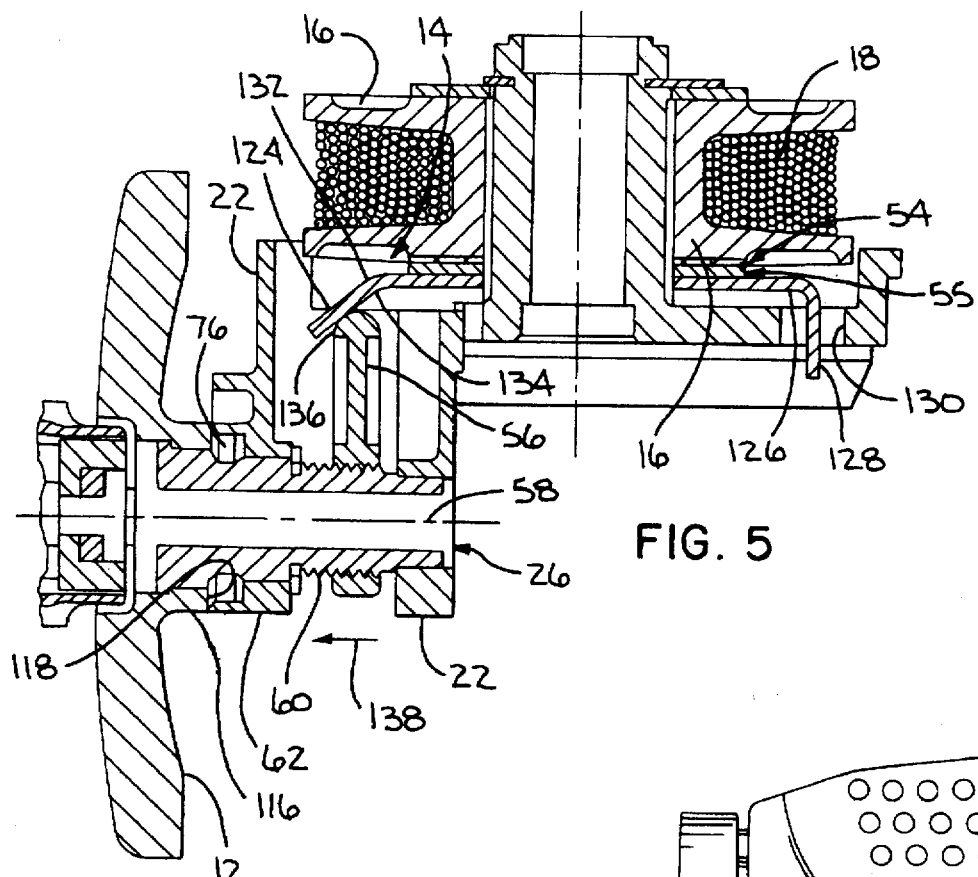
FIG. 5 is an enlarged, fragmentary, cross-sectional view of the fishing reel of FIG. 1 showing a drag system for a line carrying spool.

As seen in FIG. 5, the slide actuator 56 cooperates with a clutch plate 124 to vary the forward frictional force applied by the clutch plate 124 to the spool 16 through the intermediate spool and drag washers 55, 54.

More particularly, the clutch plate 124 has a flat cylindrically-shaped body 126 with an offset tab 128 that fits into a bore 130 in the reel body 22 to consistently locate the clutch plate 124 on the reel body 22. The opposite end of the clutch plate 124 has an angled actuator tab 132 defining a ramp surface 134 which coacts with a nose 136 on the slide element 56.

Rotation of the drag actuator knob 12 in a clockwise direction, as viewed from the left side of FIG. 5, causes the slide element 56 to travel from right to left in FIG. 5, i.e. in the direction of the arrow 138. As this occurs, the nose 136 travels over the ramp surface 134, thereby camming the clutch plate 124 forwardly against the spool and drag washers 55, 54 to increase the drag force on the spool 16. Opposite rotation of the actuator knob 12 reduces the holding force exerted through the drag assembly 14 on the spool 16.

It can be seen that the clicker element 76 is positively held on the bearing sleeve 60 and, by reason of its symmetrical shape, will produce the same audible clicking noise with the actuator 12 moved in either direction of rotation. The clicker element 76 can be pressed onto either side of the bearing sleeve 60. Since the clicker element 76 is symmetrical, it cannot be assembled improperly and will snap into its operative position through a simple press fitting step.

The foregoing disclosure of specific embodiments is intended to be illustrative of the broad concepts comprehended by the invention.

I claim:
1. A fishing reel comprising:
   a frame;
   a reel operating mechanism on the frame, said reel operating mechanism including a line carrying spool, first means for directing line onto the line carrying spool, and a settable drag mechanism for allowing line to be drawn off the spool with a variable predetermined force applied to fishing line on the line carrying spool,
   said drag mechanism including a first member guided in rotation relative to the frame around a first axis as an incident of which the predetermined force at which line is allowed to be drawn off of the spool is changed;

a clicker element having a relaxed state;

second means on and one of the frame and operating mechanism for maintaining the clicker element in an operative position on the fishing reel; and third means on the other of the frame and operating mechanism for cooperating with the clicker element for giving a sensory indication to the user as an incident of the first member rotating about the first axis, wherein the clicker element has a body that includes first and second legs and the second means is captively held cooperatively by the first and second legs with the clicker element in the operative position, wherein the one of the frame and operating mechanism has first and second surfaces, said first and second legs being simultaneously engageable one each with the first and second surfaces with the clicker in the relaxed state and a first position, said clicker and first and second surfaces being configured so that the clicker can be advanced from the first position in a first path that is transverse to the first axis into the operative position, said first and second legs being initially caused to spread away from each other by the first and second surfaces as the clicker element is advanced from the first position in the first path, said first and second legs springing back towards each other as the clicker element realizes the operative position.

2. The fishing reel according to claim 1 wherein the clicker element body has a V-shaped configuration and an apex at the juncture of the first and second legs and the third means cooperates with the apex of the clicker element body to give the sensory indication to the user.

3. The fishing reel according to claim 2 wherein the third means comprise a plurality of serially arranged projections and recesses with the apex of the clicker member body moving into and out of the recesses and over the projections as the first member rotates about the first axis.

4. The fishing reel according to claim 1 wherein the first and second legs define a V shape with an included angle and the body is symmetrical on both sides of a plane bisecting the included angle.

5. The fishing reel according to claim 1 wherein the second means comprises means for allowing the clicker element to be removably maintained in the operative position.

6. The fishing reel according to claim 1 wherein the clicker element comprises a single piece of formed flat metal stock.

7. The fishing reel according to claim 1 wherein the first and second legs each have a free end, at least one of the first and second legs is bendable, in the relaxed state the free ends of the first and second legs are spaced from each other a first distance, and with the clicker element in the operative position the free ends of the first and second legs are spaced from each other a second distance that is different than the first distance.

8. The fishing reel according to claim 1 wherein the first and second legs each have a free end, there being a projection on one of a) one of the first and second legs and b) the one of the flame and operating mechanism and a seat for the projection on the other of the one of the first and second legs and the one of the frame and operating mechanism, said projection being biased into the seat with the clicker in the operative position.

9. The fishing reel according to claim 1 wherein the clicker element has a V-shaped configuration with an apex with the V Shape defined by the clicker element opening in one direction, the second means comprises means for maintaining the clicker element in a second operative position on the fishing reel wherein the V shape defined by the clicker element opens oppositely to the one direction and the apex of the clicker element acts against the other of the frame and operating mechanism for giving a sensory indication to the user as an incident of the first member rotating about the first axis, said apex being spaced the same distance from the first axis with the clicker element in each Of the first and second operative positions.

10. The fishing reel according to claim 1 wherein the first member is a rotatable sleeve which is captively held between the first and second legs of the clicker element body with the clicker element in the operative position.

11. The fishing reel according to claim 10 wherein the operating mechanism includes a crank shaft with a crank handle thereon that is manipulatable by an operator to effect rotation of the crank shaft and the crank shaft is guided in rotation within the first member.

12. The fishing reel according to claim 1 wherein a part of the frame guides rotation of the first member and the third means is formed as one piece with the part of the frame.

13. The fishing reel according to claim 1 wherein the first member has a cylindrical shape with a radial undercut defining an axially facing surface and with the clicker element in the operative position at least a part of the clicker element abuts the axially facing surface on the first member.

14. The fishing reel according to claim 13 wherein the drag mechanism includes an actuator knob and the clicker element is captive between the axially facing surface of the first member and the actuator knob.

15. The fishing reel according to claim 1 wherein the first member has a cylindrical shape, the first and second surfaces are substantially flat surfaces angled with respect to each other and each terminating at a projection, each of said first and second legs being bendable towards and away from the other of the first and second legs, the first and second legs are joined at an apex to define a V shape, the first and second legs each have a free end with a seat adjacent the free end, and by abutting the free ends of the clicker element legs one each to the flat surfaces on the first member and moving the clinker element in the first path by pressing the clicker element against the first member the first and second legs bias progressively away from each other until the projections on the first member align one each with the seats adjacent the free ends of the clicker element legs whereupon the first and second legs spring back towards each other to biasably maintain the projections in the seats.

16. The fishing reel according to claim 15 wherein the first member has third and fourth flat surfaces angled with respect to each other and each terminating at a projection, and by abutting the free ends of the clicker element legs one each to the third and fourth surfaces and pressing the clicker element against the first member the first and second legs bias progressively away from each other until the projections at which the third and fourth surfaces terminate align one each with the seats adjacent the free ends of the clicker element legs whereupon the first and second legs spring back towards each other to biasably maintain the projections in the seats.

17. A fishing reel comprising:

a reel frame;

a reel operating mechanism on the frame, said reel operating mechanism including a line carrying spool, first means for directing line onto the line carrying spool, and a settable drag mechanism for allowing line to be drawn off the spool with a variable predetermined force applied to fishing line on the line carrying spool, said drag mechanism including a first member guided in rotation relative to the frame around a first axis as an incident of which the predetermined force at which line is allowed to be drawn off of the spool is changed;

a clicker element having a V-shaped configuration with first and second legs opening in a first direction;

second means on the first member for maintaining the clicker element in an operative position on the fishing reel; and third means on the frame for cooperating with the clicker element for giving a sensory indication to the user as an indident of the first member rotating about the first axis, said first member having first and second surfaces against which each of the first and second legs can be simultaneously pressed with the clicker element as the clicker element moves in a first path substantially in the first direction into the operative position, said first and second surfaces being configured so that said first and second legs are moved progressively away from each other by the surfaces on the first member as the clicker element moves in the first path, and spring back towards each other when the clicker element reaches the operative position, wherein the first member is captively maintained between the first and seconds legs of the clicker element.

18. The fishing reel according to claim 17 wherein the frame has a portion that guides the first member in rotation and the third means is formed as one piece with the portion of the frame.

19. The fishing reel according to claim 18 wherein the third means comprises a plurality of annularly arranged and alternating recesses and projections and the clicker element body has an apex at the juncture of the first and second legs and the apex moves into and out of the recesses and over the projections as the first member rotates about the first axis.

20. The fishing reel according to claim 19 wherein the clicker element is defined by a single formed piece of flat metal stock.

* * * * *